(12) United States Patent
Iwata et al.

(10) Patent No.: US 6,447,949 B2
(45) Date of Patent: *Sep. 10, 2002

(54) BATTERY HAVING ELECTROLYTE INJECTING PLUG

(75) Inventors: Mikio Iwata; Kazumasa Matsuo; Takefumi Inoue; Hiroaki Yoshida, all of Kyoto (JP)

(73) Assignee: Japan Storage Battery Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,708

(22) Filed: Sep. 13, 1999

(30) Foreign Application Priority Data

Sep. 11, 1998 (JP) .......................................... 10-257901

(51) Int. Cl.⁷ ................................................ H01M 2/08
(52) U.S. Cl. ........................ 429/185; 429/171; 429/176
(58) Field of Search ............................ 429/176, 53, 73, 429/74, 171, 185

(56) References Cited

U.S. PATENT DOCUMENTS

| | | | | |
|---|---|---|---|---|
| 4,600,664 A | * | 7/1986 | Cramer | 429/7 |
| 5,150,745 A | * | 9/1992 | Fprd | 141/241 |
| 5,693,430 A | * | 12/1997 | Iwatsu | 429/72 |
| 5,879,416 A | * | 3/1999 | Nakamura | 29/623.2 |
| 6,045,944 A | * | 4/2000 | Okada | 429/163 |
| 6,174,620 B1 | * | 1/2001 | Okada | 429/176 |
| 6,190,798 B1 | * | 2/2001 | Okada | 429/163 |

FOREIGN PATENT DOCUMENTS

| | | | | |
|---|---|---|---|---|
| JP | 61224260 | * | 10/1986 | H01M/2/02 |
| JP | 11025936 | * | 1/1999 | H01M/2/36 |

* cited by examiner

*Primary Examiner*—Patrick Ryan
*Assistant Examiner*—Mark Ruthkosky
(74) *Attorney, Agent, or Firm*—Sughrue Mion, PLLC (57) ABSTRACT

An electrolyte injecting metallic plug laser-welded to an outer edge of an electrolyte injecting port on a periphery of a battery case. At least a part of the electrolyte injecting metallic plug is inserted into the electrolyte injecting port.

14 Claims, 6 Drawing Sheets

BATTERY HAVING ELECTROLYTE INJECTING PLUG

BACKGROUND OF THE INVENTION

1. Field of the Invention

The present invention relates to a battery such as a non-aqueous electrolyte battery having an electrolyte injecting port formed on a battery case and plugged by an electrolyte injecting plug.

2. Description of the Related Art

Figure 11:
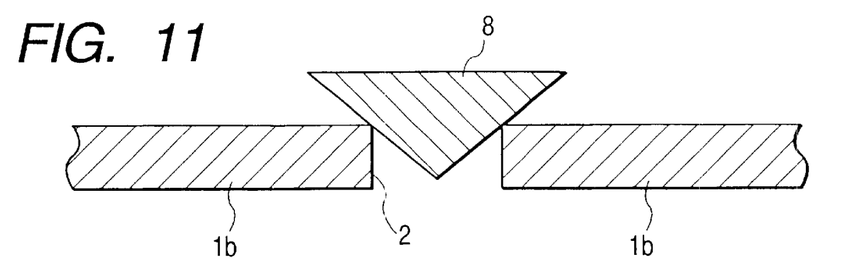
FIG. 11 is a partially enlarged vertical sectional view illustrating a conventional example of small-sized non-aqueous electrolyte secondary battery showing the arrangement in which an electrolyte injecting port formed in the battery case of the non-aqueous secondary battery is plugged by an electrolyte injecting plug.

In a conventional small-sized non-aqueous electrolyte battery, an aluminum conical electrolyte injecting plug 8 as shown in FIG. 11 is spot-welded to an electrolyte injecting port 2 formed on the battery case 1 through which an electrolyte has been injected into the battery so that the electrolyte injecting plug 8 is welded to the external edge of the electrolyte injecting port 2 to plug the port.

Figure 2:
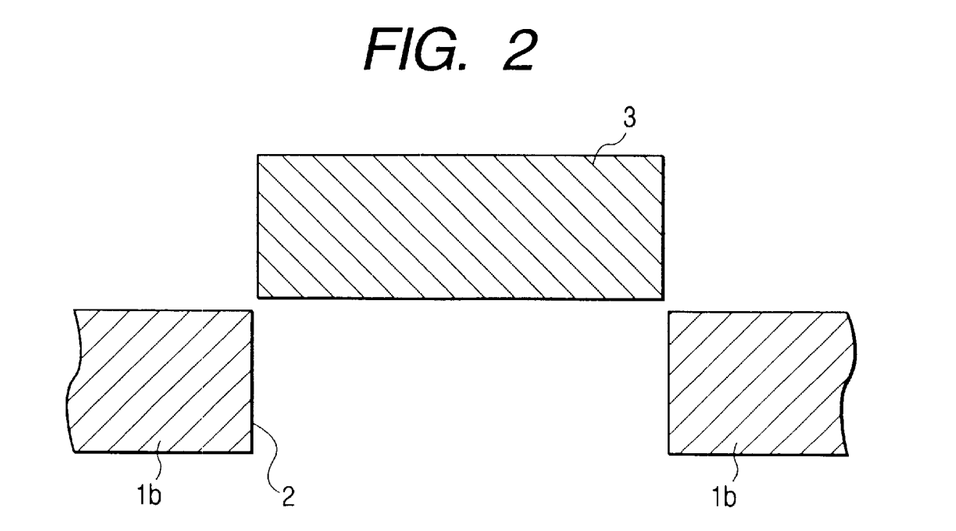
FIG. 2 is a partially enlarged vertical sectional view illustrating another embodiment of the present invention showing an electrolyte injecting port formed on the battery case cover of a non-aqueous electrolyte secondary battery and an electrolyte injecting plug provided inserted in said electrolyte injecting port.
Figure 13:
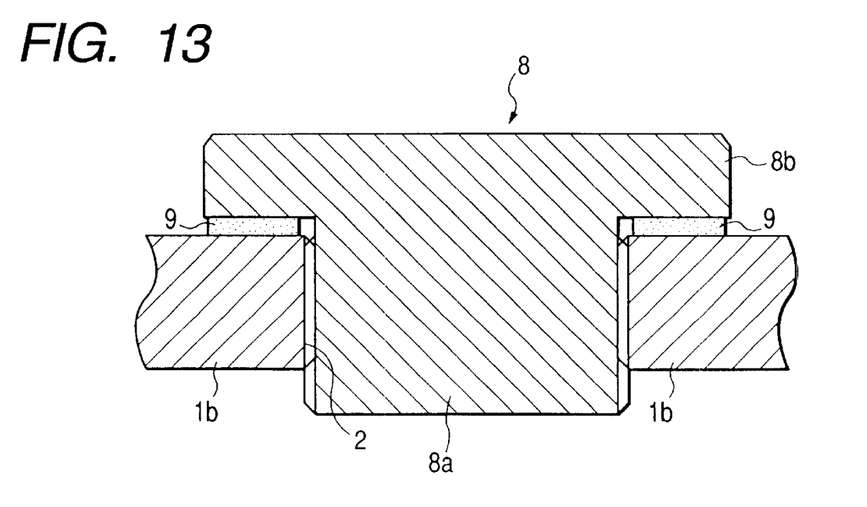
FIG. 13 is a partially enlarged vertical sectional view illustrating a conventional example of large-sized non-aqueous electrolyte secondary battery showing the arrangement in which an electrolyte injecting plug is threaded into an electrolyte injecting port formed on the battery case of the non-aqueous electrolyte secondary battery and sealed thereto with a packing.

However, as the size of the battery increases, the diameter of the electrolyte injecting port 2 must be increased. Consequently, it is made more difficult to spot-weld a large-sized electrolyte injecting plug 8 completely to the electrolyte injecting port 2 leaving no gap therebetween. In order to overcome this difficulty with the conventional non-aqueous electrolyte battery, it has been a practice to form a female thread on the electrolyte injecting port 2 as shown in FIG. 13. A male thread formed on the forward end 8a of the electrolyte injecting plug 8 is engaged with the female thread. A packing 9 is provided to be interposed between the flange portion 8b of the electrolyte injecting plug 8 and the outer edge of the electrolyte injecting port 2. Consequently, the electrolyte injecting port 2 through which an electrolyte has been injected into the battery is plugged, as shown in FIG. 13.

Alternatively, the electrolyte injecting plug is fastened to the battery case with a nut on the other side of the electrolyte injecting port 2 instead of forming a female thread on the electrolyte injecting port 2. An O-ring is provided to be interposed between the flange portion 8b of the electrolyte injecting plug 8 and the outer edge of the electrolyte injecting port 2 instead of packing 9. Further, the packing 9 or O-ring may be fitted in an annular groove formed on the inner side of the flange portion 8b.

However, because the packing 9 or O-ring is made of a rubber or synthetic resin material, it has the following problems. Namely, it is liable to deterioration due to aging and hence denaturation due to contact with the electrolyte or heat generated upon excessive charge and discharge. Accordingly, it may cause the deterioration of the airtightness of the sealed portion resulting in the leakage of the electrolyte.

Further, if the electrolyte injecting plug 8 having a male thread formed at the forward end thereof or a flange portion 8b thereon is used, a large protrusion is formed at the sealed portion to an extent such that it gives an offense to the eye or an obstruction in handling.

SUMMARY OF THE INVENTION

It is an object of the present invention to provide a battery which is rendered unsusceptible to deterioration of airtightness of the sealed portion by fitting an electrolyte injecting plug in an electrolyte injecting port and laser-welding the electrolyte injecting plug to the electrolyte injecting port at the periphery thereof.

According to a first aspect of the present invention, a battery comprises: a metallic battery case for housing an electricity-generating element, the metallic battery case having an electrolyte injecting port of an electrolyte; and an electrolyte injecting metallic plug laser-welded to an outer edge of the electrolyte injecting port on a periphery of the battery case, at least a part of the electrolyte injecting metallic plug being inserted into the electrolyte injecting port.

In accordance with the first aspect of the present invention, an electrolyte injecting plug is laser-welded to an electrolyte injecting port at the periphery thereof with its entire part or forward end being inserted therein. In this arrangement, the electrolyte injecting plug can be fixed to the electrolyte injecting port to assure that the electrolyte injecting port is plugged. Further, since the electrolyte injecting plug can be easily welded to the electrolyte injecting port at the periphery thereof by allowing a laser spot to run, the electrolyte injecting port cannot be insufficiently plugged even if the size of the electrolyte injecting port is increased to increase the periphery of the electrolyte injecting plug to be welded. Moreover, since metals are welded to each other to plug the electrolyte injecting port free from packing or O-ring, the airtightness of the sealed portion cannot be deteriorated.

More preferably, the diameter or diagonal distance of the foregoing electrolyte injecting port is not less than 2.5 mm.

According to a second aspect of the present invention, concerning to the battery defined in the first aspect, the electrolyte injecting port is a stepped or tapered round port which is greater outside the battery case than inside the battery case in diameter and the plug inserted in the electrolyte injecting port is a stepped or tapered disc.

In accordance with the second aspect of the present invention, the electrolyte injecting plug can be securely fitted in the electrolyte injecting port and thus cannot fall into the interior of the battery case.

Further, by arranging the electrolyte injecting plug such that the outer surface thereof is almost flush with the surface of the outer edge of the electrolyte injecting port, the outer surface of the electrolyte injecting plug can be prevented from protruding from the battery case. In this arrangement, the electrolyte injecting plug does not give an offense to the eye or an obstruction in handling.

A third aspect of the present invention concerns the battery defined in the first aspect, wherein the electrolyte injecting plug has a forward end protruding into the electrolyte injecting port from the inner side of a flange having a greater diameter or diagonal distance than that of the electrolyte injecting port.

In accordance with the third aspect of the present invention, the flange portion of the electrolyte injecting plug protrudes from the battery case, but the forward end of the electrolyte injecting plug can be securely fitted in the electrolyte injecting port.

Further, the electrolyte injecting plug can form a male thread on the forward end thereof while the electrolyte injecting port can form a female thread on the inner surface thereof to engage with the male thread so that the electrolyte injecting plug fitted in the electrolyte injecting port can be securely fixed thereto.

According to a fourth aspect of the present invention concerns the battery defined in the first or second aspect, wherein both the electrolyte injecting port and the electrolyte injecting plug have a curved portion formed protruding externally at the external edge thereof.

In accordance with the fourth aspect of the present invention, since the provision of a curved portion on the outer edge of the electrolyte injecting port and the electrolyte injecting plug, it is possible to prevent the diffusion of heat during laser welding and hence secure the welding of metal to metal.

PREFERRED EMBODIMENTS OF THE INVENTION

Preferred embodiments of the present invention will be described in connection with the attached drawings.

Figure 1:
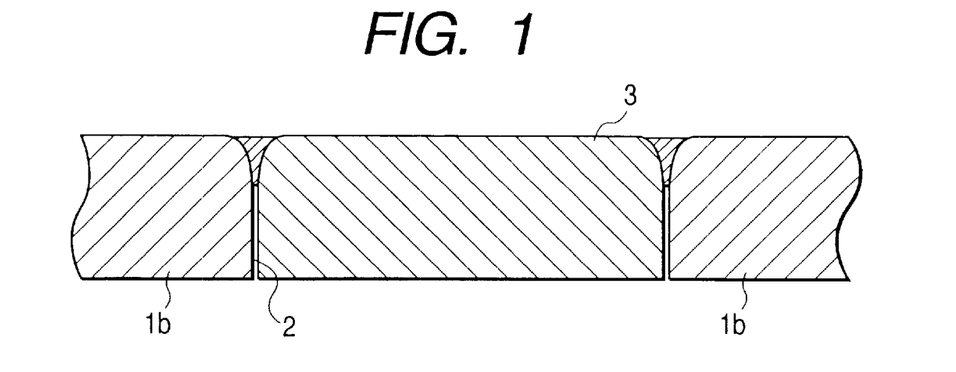
FIG. 1 is a partially enlarged vertical sectional view illustrating an embodiment of the present invention showing an electrolyte injecting plug formed laser-welded to an electrolyte injecting port formed on the battery case cover of a non-aqueous electrolyte secondary battery and inserted therein.
Figure 3:
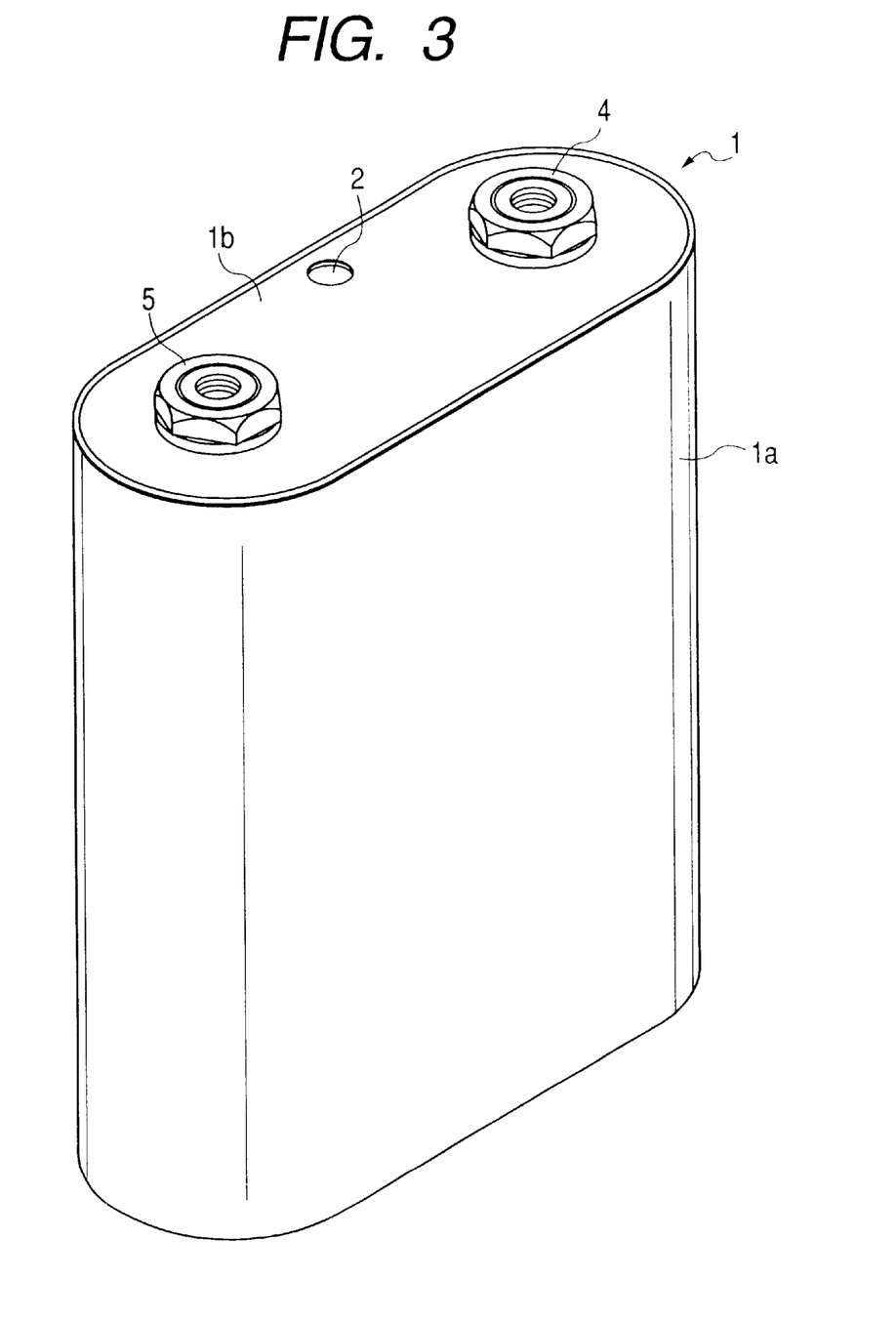
FIG. 3 is an entire perspective view illustrating a further embodiment of the present invention showing the external appearance of a large-sized non-aqueous electrolyte secondary battery.
Figure 4:
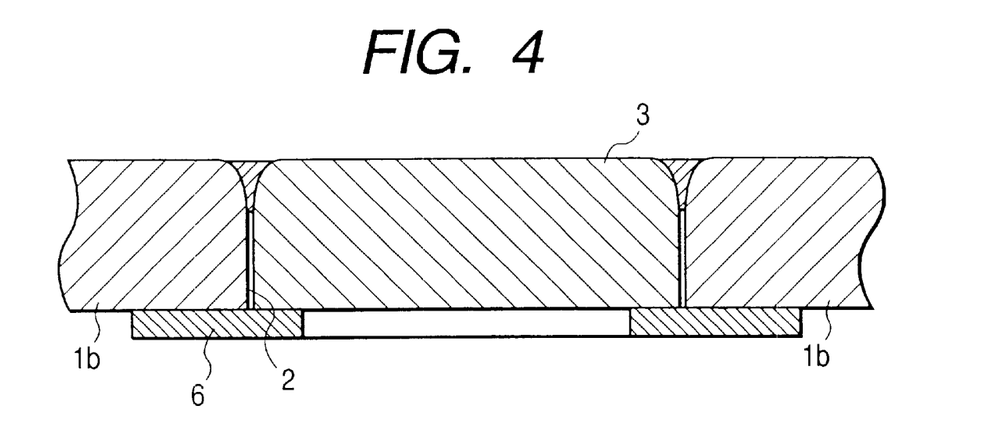
FIG. 4 is a partially enlarged vertical sectional view illustrating a further embodiment of the present invention showing the arrangement in which an electrolyte injecting plug inserted in an electrolyte injecting port is stopped by a stopper plate.
Figure 5:
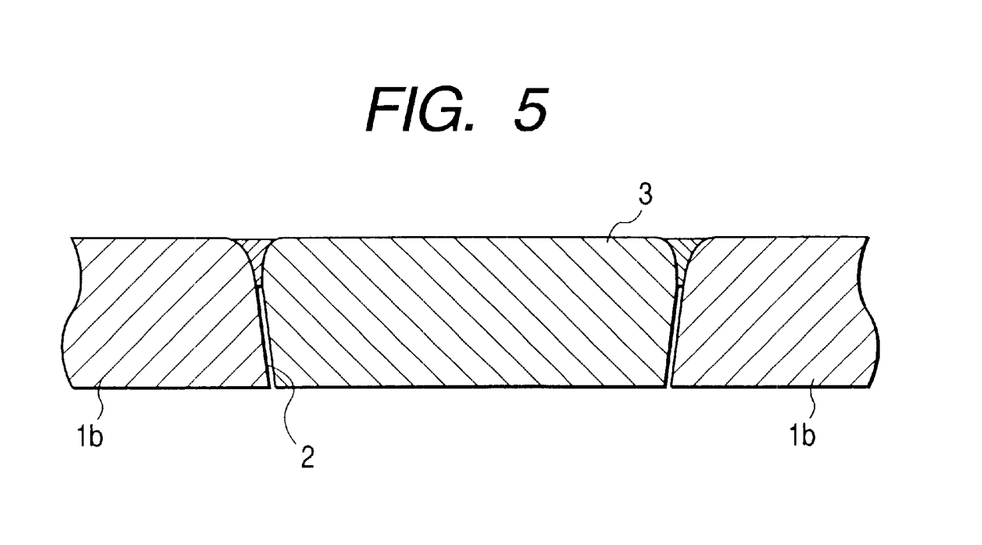
FIG. 5 is a partially enlarged vertical sectional view illustrating a further embodiment of the present invention showing the arrangement in which the electrolyte injecting port and the electrolyte injecting plug are tapered.
Figure 6:
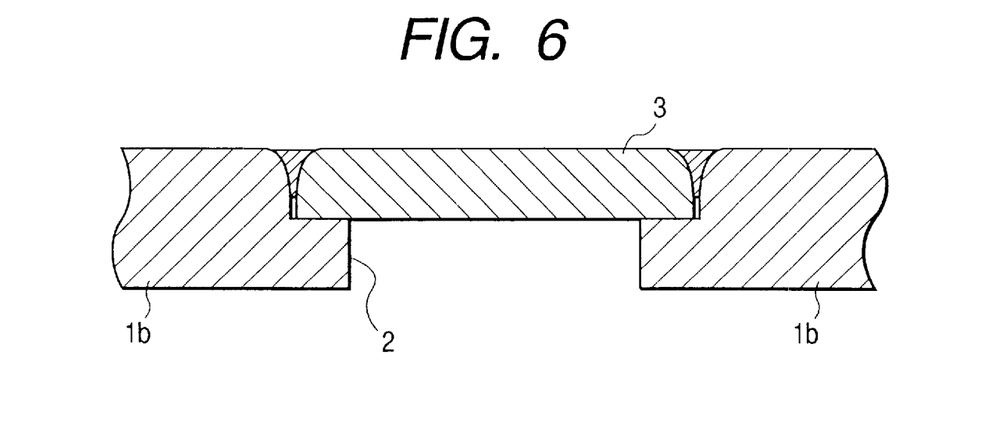
FIG. 6 is a partially enlarged vertical sectional view illustrating a further embodiment of the present invention showing the arrangement in which the electrolyte injecting port is stepped.
Figure 7:
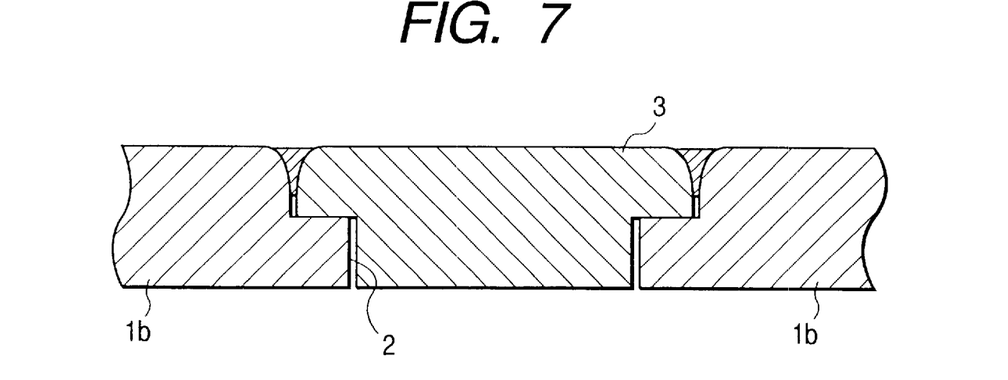
FIG. 7 is a partially enlarged vertical sectional view illustrating a further embodiment of the present invention showing the arrangement in which the electrolyte injecting port and the electrolyte injecting plug are stepped.
Figure 8:
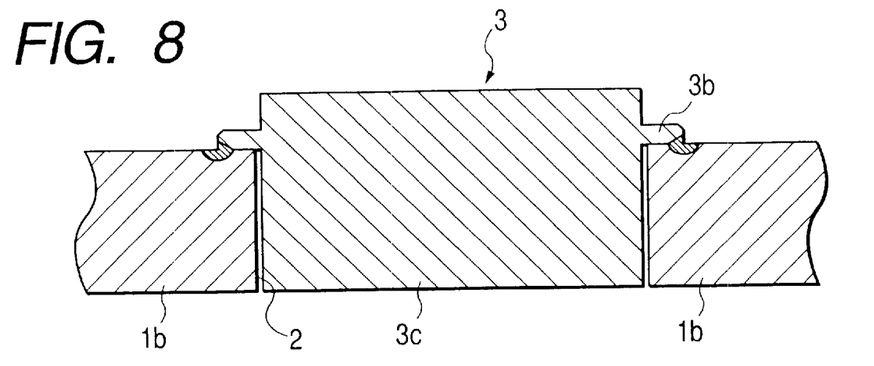
FIG. 8 is a partially enlarged vertical sectional view illustrating a further embodiment of the present invention showing the arrangement in which the electrolyte injecting plug comprises a flange portion formed thereon.
Figure 9:
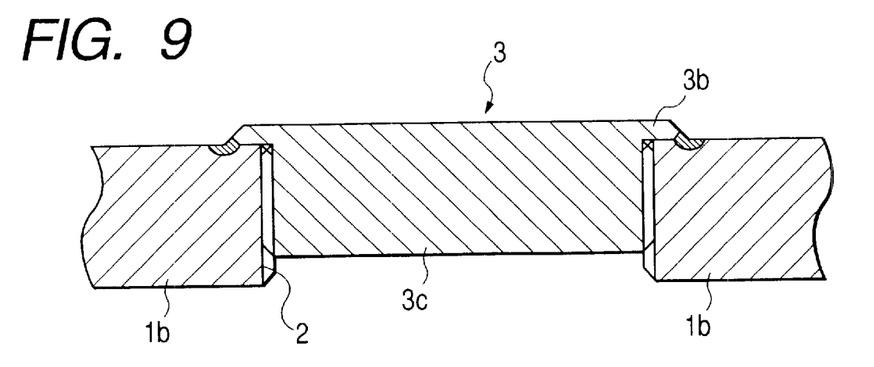
FIG. 9 is a partially enlarged vertical sectional view illustrating a further embodiment of the present invention showing the arrangement in which the electrolyte injecting port and the electrolyte injecting plug are threaded at the forward end thereof.
Figure 10:
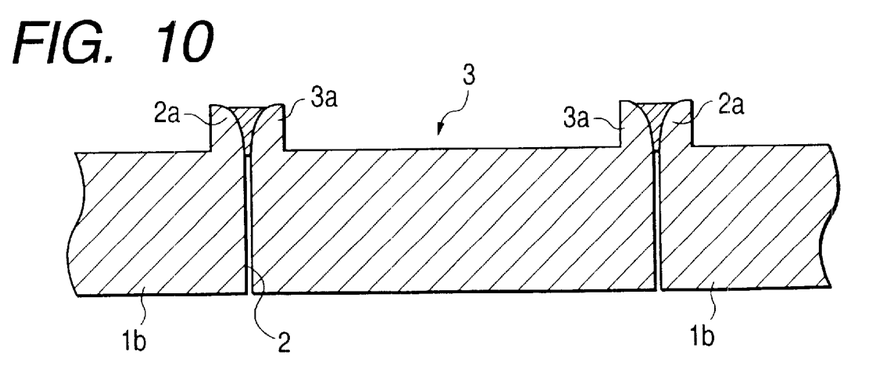
FIG. 10 is a partially enlarged vertical sectional view illustrating a further embodiment of the present invention showing the arrangement in which the electrolyte injecting port and the electrolyte injecting plug each comprise a curved portion formed thereon.
Figure 12:
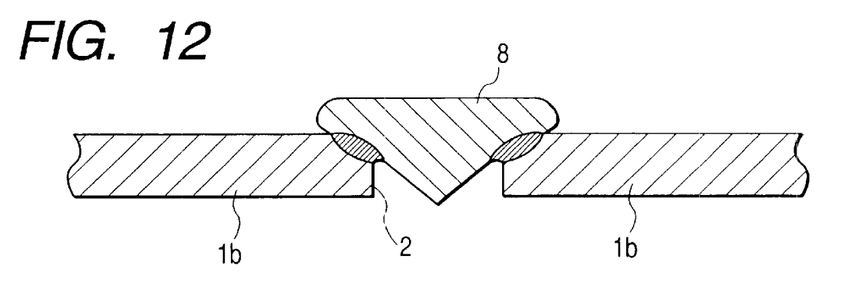
FIG. 12 is a partially enlarged vertical sectional view illustrating the conventional example of small-sized non-aqueous electrolyte secondary battery showing the arrangement in which the electrolyte injecting port formed in the battery case of the non-aqueous secondary electrolytic battery and plugged by the electrolyte injecting plug is spot-welded thereto.

FIGS. 1 to 10 each illustrates an embodiment according to the present invention. FIG. 1 is a partially enlarged vertical sectional view illustrating an embodiment of the present invention showing an electrolyte injecting plug formed laser-welded to an electrolyte injecting port formed on the battery case cover of a non-aqueous electrolyte secondary battery and inserted therein. FIG. 2 is a partially enlarged vertical sectional view illustrating another embodiment of the present invention showing an electrolyte injecting port formed on the battery case cover of a non-aqueous electrolyte secondary battery and an electrolyte injecting plug provided inserted in said electrolyte injecting port. FIG. 3 is an entire perspective view illustrating a further embodiment of the present invention showing the external appearance of a large-sized non-aqueous electrolyte secondary battery. FIG. 4 is a partially enlarged vertical sectional view illustrating a further embodiment of the present invention showing the arrangement in which an electrolyte injecting plug inserted in an electrolyte injecting port is stopped by a stopper plate. FIG. 5 is a partially enlarged vertical sectional view illustrating a further embodiment of the present invention showing the arrangement in which the electrolyte injecting port and the electrolyte injecting plug are tapered. FIG. 6 is a partially enlarged vertical sectional view illustrating a further embodiment of the present invention showing the arrangement in which the electrolyte injecting port is stepped. FIG. 7 is a partially enlarged vertical sectional view illustrating a further embodiment of the present invention showing the arrangement in which the electrolyte injecting port and the electrolyte injecting plug are stepped. FIG. 8 is a partially enlarged vertical sectional view illustrating a further embodiment of the present invention showing the arrangement in which the electrolyte injecting plug comprises a flange portion formed thereto. FIG. 9 is a partially enlarged vertical sectional view illustrating a further embodiment of the present invention showing the arrangement in which the electrolyte injecting port and the electrolyte injecting plug are threaded at the forward end thereof. FIG. 10 is a partially enlarged vertical sectional view illustrating a further embodiment of the present invention showing the arrangement in which the electrolyte injecting port and the electrolyte injecting plug each has a curved portion formed thereon. Where the parts function in the same way as those of FIGS. 11 to 13, which illustrate conventional examples, the same numbers are used.

The present embodiment of the present invention will be described with reference to a large-sized non-aqueous electrolyte secondary battery as shown in FIG. 3. This non-aqueous electrolyte secondary battery has a battery case 1 composed of an ellipsoidal battery case main body 1a made of aluminum alloy or stainless steel and a battery case cover portion 1b made of the same material fitted therein and airtightly TIG or laser-welded thereto at its periphery. A coiled ellipsoidal electricity-generating element (not shown) is housed in the interior of the battery case 1 before the welding of the battery case cover portion 1b to the battery case main body 1a. A positive electrode terminal 4 and a negative electrode terminal 5 connected to the positive and negative electrodes of the electricity-generating element, respectively, inside the battery case are provided protruding from the top of the battery case cover portion 1b. The battery case cover portion 1b has an electrolyte injecting port 2 formed thereon through which a non-aqueous electrolyte is injected into the interior of the battery case after the welding of the battery case cover portion 1b to the battery case main body 1a. The electrolyte injecting port 2 is a round port having a diameter as high as not less than 2.5 mm because the non-aqueous electrolyte secondary battery is large-sized and thus requires a large amount of a non-aqueous electrolyte to be injected and the thickness of the battery case cover portion 1b is as great as about 1.2 mm.

The foregoing non-aqueous electrolyte secondary battery is arranged such that after a non-aqueous electrolyte has been injected into the battery case through the electrolyte injecting port 2 on the battery case cover portion 1b, the electrolyte injecting port 2 is then plugged by an electrolyte injecting plug 3 as shown in FIG. 2. The electrolyte injecting plug 3 is a disc made of aluminum alloy having a diameter which is slightly smaller than that of the electrolyte injecting port 2 so that it can be fitted in the port 2 leaving little or no gap therebetween. The gap may be in the range of 0 to 1.0 mm, preferably, 0 to 0.5 mm. The thickness of the electrolyte injecting plug 3 is almost the same as that of the battery case cover portion 1b. The electrolyte injecting plug 3 is inserted into the electrolyte injecting port 2 to a depth such that the upper end surface (outer side surface) of the electrolyte injecting plug 3 is almost flush with the upper side (outer side) edge of the electrolyte injecting port 2. A laser spot is then allowed to hit the joint of the electrolyte injecting plug 3 and the battery case cover portion 1b along the periphery of the plug 3 so that the plug 3 is laser-welded to the battery case cover portion 1b. In this manner, the metal of the electrolyte injecting plug 3 and the metal of the upper edge of the electrolyte injecting port 2 are fused to each other at the joint so that the electrolyte injecting port 2 can be completely plugged leaving no gap therebetween.

Accordingly, in accordance with the present embodiment of non-aqueous electrolyte secondary battery, the electrolyte injecting port 2, now matter how large, can be securely plugged by inserting the electrolyte injecting plug 3 therein and then laser-welding the plug 3 to the battery case cover portion at its periphery. Further, since no materials liable to deterioration with time or denaturation such as packing and O-ring are used, the airtightness of the battery cannot be deteriorated during use.

In the present embodiment, the electrolyte injecting port 2 is merely a round port and the electrolyte injecting plug 3 is a disc having a perpendicular side wall. However, the electrolyte injecting plug 3 fall into the battery case 1 when inserted into the electrolyte injecting port 2. To prevent the electrolyte injecting plug 3 may from falling into the battery case 1, an annular stopper plate 6 having a smaller inner diameter than that of the electrolyte injecting port 2 but a greater outer diameter than that of the electrolyte injecting port 2 may be welded to the lower (inner) surface of the battery case cover portion 1b as shown in FIG. 4. Alternatively, both the electrolyte injecting port 2 and the electrolyte injecting plug 3 may be tapered downward to prevent the electrolyte injecting plug 3 from falling into the battery case 1 as shown in FIG. 5.

Alternatively, as shown in FIG. 6, a spot facing may be formed in the electrolyte injecting port 2 so that the inner wall of the port 2 is stepped in such an arrangement that the upper port has a greater diameter than the lower port. In this arrangement, the electrolyte injecting plug 3 can be inserted in the port 2 to the spot interfacing. Accordingly, the injecting plug 3 can be prevented from falling into the battery case 1. In this structure, the formation of the electrolyte injecting port 2 requires additional consideration. However, it is not necessary to weld the stopper plate 6 to the lower surface of the battery case cover portion 1b. Further, the electrolyte injecting plug 3 doesn't need to be tapered. Thus, this structure makes it possible to lessen the trouble of working the port 2 and the plug 3. In this structure of stepped port 2, however, the electrolyte injecting plug 3, too, may be formed stepped such that the upper portion has a greater diameter than that of the lower portion as shown in FIG. 7. In this arrangement, the electrolyte injecting port 2 can be completely plugged by the electrolyte injecting plug 3.

The foregoing embodiment has been described with reference to the arrangement such that the electrolyte injecting plug 3 doesn't protrude from the battery case cover portion 1b. However, the electrolyte injecting plug 3 may have a flange portion 3b formed on the upper portion thereof while the electrolyte injecting port 2 is merely a round port. The flange portion 3b can be formed to have a greater diameter than that of the electrolyte injecting port 2 so that the forward end 3c of the electrolyte injecting plug 3 can be prevented from falling into the battery case 1. Further, the foregoing embodiment is liable to strain the electrolyte injecting plug 3 due to heat developed by laser welding that causes the plug 3 to protrude from the electrolyte injecting port 2. However, the present embodiment is advantageous in that such a flange portion 3b, if formed to have a sufficiently small thickness, can attract heat developed by laser spot to prevent the strain of the electrolyte injecting plug 3. The upper surface of the flange 3b may protrude or may be formed flat as shown in the drawing. Alternatively, as shown in FIG. 9, a male thread may be formed on the forward end 3c of the electrolyte injecting plug 3 having a flange 3b formed on the upper portion thereof while a female thread may be formed on the inner wall of the electrolyte injecting port 2. In this arrangement, the electrolyte injecting plug 3 can be threaded into the electrolyte injecting port 2. In this structure, thread engagement assures that the flange 3b can come in close contact with the outer edge of the electrolyte injecting port 2. Accordingly, it is possible to further lessen the effect of the thermal strain of the electrolyte injecting plug 3.

Alternatively, as shown in FIG. 10, curved portions 2a and 3a may be formed protruding upward from the edge of the electrolyte injecting port 2 and the electrolyte injecting plug 3, respectively. In this structure, too, the curved portions 2a and 3a can be formed to have a small thickness, making it possible to prevent the heat of laser spot from being diffused to the main body of the electrolyte injecting plug 3 to cause strain. Further, since the joint faces upward, the joint can attract heat developed upon irradiation with laser spot to facilitate the fusion of metal, assuring the sealing by laser welding. In this structure, too, a stopper plate 6 may be welded to the lower surface of the battery case cover portion 1b. Alternatively, the electrolyte injecting port 2 or the electrolyte injecting plug 3 may be formed stepped. In this arrangement, the electrolyte injecting plug 3 can be prevented from falling into the battery case 1.

The foregoing embodiment has been described with reference to the arrangement such that the electrolyte injecting port 2 is formed on the battery case cover portion 1b of the battery case 1. However, the electrolyte injecting port 2 may be formed at other positions on the battery case 1. Further, the configuration of the battery case 1 is not limited to the foregoing embodiment. The foregoing embodiment has been described with reference to the arrangement such that the electrolyte injecting port 2 is a round port and the electrolyte injecting plug 3 is a disc. However, these components may be rectangular, polygonal or otherwise. Further, the foregoing embodiment has been described with reference to a large-sized non-aqueous electrolyte secondary battery. However, the present invention doesn't necessarily need to apply to a large-sized battery or secondary battery. The present invention can apply also to other kinds of batteries.

As made obvious from the foregoing description, the battery of the present invention is arranged such that an electrolyte injecting plug which has been inserted in an electrolyte injecting port is laser-welded at the periphery thereof. In this arrangement, even if the electrolyte injecting port is large, the metal of the battery case cover portion and the electrolyte injecting plug can be fused to each other to assure that the port is completely plugged. Accordingly, no packing or O-ring is required, making it unlikely that the airtightness of battery can be deteriorated.

What is claimed is:

1. A battery comprising:
   a metallic battery case for housing an electricity-generating element, said metallic battery case having an electrolyte injecting port for an electrolyte; and
   an electrolyte injecting metallic plug having a periphery of said battery case, at least a part of said electrolyte injecting metallic plug being inserted into said electrolyte injecting port and wherein only said periphery of said electrolyte injecting metallic plug is laser-welded to said electrolyte injecting port,
   wherein said electrolyte injecting port is a tapered round port having a diameter which is greater outside said battery case than inside said battery case, and said electrolyte injecting metallic plug is a tapered disc.

2. The battery according to claim 1, wherein an outer surface of said electrolyte injecting metallic plug is substantially flush with an outer surface of outer edge of said electrolyte injecting port, so that said electrolyte injecting metallic plug does not protrude outwardly from said battery case.

3. A battery comprising:
   a metallic battery case for housing an electricity-generating element, said metallic battery case having an electrolyte injecting port for an electrolyte; and
   an electrolyte injecting metallic plug having a periphery thereof laser-welded to an outer edge of said electrolyte injecting port on a periphery of said battery case, at least a part of said electrolyte injecting metallic plug being inserted into said electrolyte injecting port and wherein only said periphery of said electrolyte injecting metallic plug is laser-welded to said electrolyte injecting port,
   wherein said electrolyte injecting port has a stepped shape so that a diameter of a portion of said electrolyte injecting port disposed outside said battery case is greater than a diameter of a portion of said electrolyte injecting port disposed inside said battery case.

4. The battery according to claim 3, wherein said plug inserted in said electrolyte injecting port is stepped.

5. The battery according to claim 3, wherein said electrolyte injecting plug has a forward end protruding into said electrolyte injecting port from the inner side of a flange having a greater diameter or diagonal distance than that of said electrolyte injecting port.

6. A battery comprising:
   a metallic battery case for housing an electricity-generating element, said metallic battery case having an electrolyte injecting port for an electrolyte; and
   an electrolyte injecting metallic plug having a periphery thereof laser-welded to an outer edge of said electrolyte injecting port on a periphery of said battery case, at least a part of said electrolyte injecting metallic plug being inserted into said electrolyte injecting port and wherein only said periphery of said electrolyte injecting metallic plug is laser-welded to said electrolyte injecting port,
   wherein a flange protrudes from said electrolyte injecting plug having a greater diameter than that of said electrolyte injecting port, and the flange has a forward end protruding into said electrolyte injecting port from an inner side of the flange, and wherein the flange has a tapered portion at an injecting port upper surface side, which contacts with an upper surface of said injecting port.

7. A battery comprising:
   a metallic battery case for housing an electricity-generating element, said metallic battery case having an electrolyte injecting port for an electrolyte; and
   an electrolyte injecting metallic plug having a periphery thereof laser-welded to an outer edge of said electrolyte injecting port on a periphery of said battery case, at least a part of said electrolyte injecting metallic plug being inserted into said electrolyte injecting port and wherein only said periphery of said electrolyte injecting metallic plug is laser-welded to said electrolyte injecting port,
   wherein a flange protrudes from said electrolyte injecting plug and has a greater diameter than a diameter of said electrolyte injecting port, and a forward end of the flange protrudes into said electrolyte injecting port from an inner side of the flange, and wherein said electrolyte injecting plug and said electrolyte injecting port have respectively threaded portions which are engaged with each other.

8. A battery comprising:
   a metallic battery case for housing an electricity-generating element, said metallic battery case having an electrolyte injecting port for an electrolyte; and
   an electrolyte injecting metallic plug having a periphery thereof laser-welded to an outer edge of said electrolyte injecting port on a periphery of said battery case, at least a part of said electrolyte injecting metallic plug being inserted into said electrolyte injecting port and wherein only said periphery of said electrolyte injecting metallic plug is laser-welded to said electrolyte injecting port,
   wherein said electrolyte injecting port has a projecting portion projecting upward from a side thereof and said electrolyte injecting plug has a projecting portion projecting upward from a side thereof, said projecting portions being abutted together and welded with each other.

9. The battery according to claim 4, wherein said electrolyte injecting port has a projecting portion projecting upward from a side thereof and said electrolyte injecting plug has a projecting portion projecting upward from a side thereof, said projecting portions being abutted together and welded with each other.

10. The battery according to claim 1, wherein said electrolyte injecting port has a projecting portion projecting upward from a side thereof and said electrolyte injecting plug has a projecting portion projecting upward from a side thereof, said projecting portions being abutted together and welded with each other.

11. The battery according to claim 3, wherein said electrolyte injecting port has a projecting portion projecting upward from a side thereof and said electrolyte injecting plug has a projecting portion projecting upward from a side thereof, said projecting portions being abutted together and welded with each other.

12. The battery comprising:
- a metallic battery case for housing an electricity-generating element, said metallic battery case having an electrolyte injecting port for an electrolyte;
- an electrolyte injecting metallic plug having a periphery thereof laser-welded to an outer edge of said electrolyte injecting port on a periphery of said battery case, at least a part of said electrolyte injecting metallic plug being inserted into said electrolyte injecting port and wherein only said periphery of said electrolyte injecting metallic plug is laser-welded to said electrolyte injecting port; and
- an annular stopper plate attached to an inner surface of said battery case adjacent said electrolyte injecting port, said stopper plate having an inner diameter that is smaller than that of said electrolyte injecting port to prevent said electrolyte injecting metallic plug from falling into said battery case.

13. The battery according to claim 12, wherein an outer surface of said electrolyte injecting metallic plug is substantially flush with an outer surface of outer edge of said electrolyte injecting port, so that said electrolyte injecting metallic plug does not protrude outwardly from said battery case.

14. The battery according to claim 12, wherein said electrolyte injecting port has a projecting portion projecting upward from a side thereof and said electrolyte injecting plug has a projecting portion projecting upward from a side thereof, said projecting portions being abutted together and welded with each other.

* * * * *